(12) United States Patent
Kuo et al.

(10) Patent No.: US 6,809,284 B1
(45) Date of Patent: Oct. 26, 2004

(54) WIRE CUT ELECTRIC DISCHARGE MACHINE

(75) Inventors: Chia-Lung Kuo, 6 F, No. 207, Lane 125, Sec. 3, Dasyue Road, Douliou City, Yunlin County (TW); Yao-Fan Su, Taoyuan (TW); Zhi-Kai Xu, Taichung (TW); Ching-Yi Wu, No. 43, Guancian Road, Baoshan Township, Hsinchu County (TW)

(73) Assignees: Taiwan Micro System Co., Ltd., Taipei (TW); Chia-Lung Kuo, Yunlin (TW); Ching-Yi Wu, Hsinchu (TW)

( * ) Notice: Subject to any disclaimer, the term of this patent is extended or adjusted under 35 U.S.C. 154(b) by 0 days.

(21) Appl. No.: 10/760,411

(22) Filed: Jan. 21, 2004

(51) Int. Cl.7 .............................................. B23H 7/10
(52) U.S. Cl. .................................................. 219/69.12
(58) Field of Search ..................................... 219/69.12

(56) References Cited

U.S. PATENT DOCUMENTS

| 4,243,864 A | * | 1/1981 | Vieau et al. | ............. | 219/69.12 |
| 4,762,974 A | * | 8/1988 | Kern | ........................ | 219/69.12 |

FOREIGN PATENT DOCUMENTS

| JP | 61-136732 | * | 6/1986 | ............... | 219/69.12 |
| JP | 2284824 A | * | 11/1990 | ............... | 219/69.12 |

* cited by examiner

Primary Examiner—Geoffrey S. Evans
(74) Attorney, Agent, or Firm—Rosenberg, Klein & Lee

(57) ABSTRACT

A wire cut electric discharge machine having several wire electrode sets is disclosed. It mainly includes a cutting machine, several wire electrode sets, and an adjustable unit. Each electrode set has an upper guiding seat, a lower guiding seat, and a wire electrode. Two ends of each wire electrode can be adjusted independently so that the cutting conditions on the workpiece can be easily and precisely adjusted. Hence, the cutting angles can be adjusted independently and the cutting precision is raised than before.

3 Claims, 6 Drawing Sheets

WIRE CUT ELECTRIC DISCHARGE MACHINE

BACKGROUND OF INVENTION

1. Field of the Invention

The present invention relates to a wire cut electric discharge machine. Particularly, it is a wire cut electric discharge machine having several adjustable electrode sets so that their cutting angles for a workpiece can be adjusted or changed.

2. Description of the Prior Art

As shown in FIG. 7, the conventional wire cut electric discharge machine includes:
- a main body 80 that has an upper fixing portion 81 and a lower fixing portion 82 so as to define a working space 83 between the upper and lower fixing portions 81, 82;
- a plurality of aligned electrode sets 90 disposed in the working space 83 and mounted between the upper and lower fixing portions 81, 82; each of the electrode set 90 has:
  - several sets of rollers 91 that are mounted on the upper and lower fixing portions 81, 82 respectively; and
  - several wire electrodes 92 corresponding to these rollers 91 and disposed between corresponding rollers 91.

However, the disadvantages of the conventional machine can be summarized as follows:

[1] The cutting angles cannot be adjusted. The conventional wire electrodes 92 are movably secured (and fed) by rollers 91. And, the rollers 91 are mounted on the upper and lower fixing portions 81, 82. It is impossible to adjust the cutting angle of any one of the wire electrodes 92. Thus, its cutting angle cannot be adjusted or altered.

[2] The cutting precision is low. The conventional wire electrodes are movably fixed on the rollers. Due to the continuous rotation and contact, the rollers will be worn away gradually. In addition, the vibration during the cutting or the vibration generated by the motor might cause the wearing of these rollers. Therefore, the outer surface of the roller will be slightly deformed (or worn out a little bit) so that the wire electrode will slightly move aside accordingly. Hence, the actual cutting angle becomes slightly tilted and the precision of the final product is poor.

SUMMARY OF THE INVENTION

The primary object of the present invention is to provide a wire cut electric discharge machine. In which, the cutting angled and be adjusted respectively.

The other object of the present invention is to provide a wire cut electric discharge machine. Its cutting precision is higher than before.

In order to achieve the above-mentioned objects, a technical solution is provided. A wire cut electric discharge machine comprises:
- a cutting machine having an upper fixing portion and a lower fixing portion, a working space being formed between said upper fixing portion and said lower fixing portion, an upper surface being disposed on said upper fixing portion and a lower surface being disposed on said lower fixing portion, an upper sliding slot being disposed on said upper fixing portion, a lower sliding slot being disposed on said lower fixing portion corresponding to said upper sliding slot;
- a plurality of wire electrode sets aligned and disposed in said working space and aligned; each electrode set including:
  - (a) an upper guiding seat having an upper fixing end and a lower fixing end, said upper guiding seat being movable along said upper sliding slot;
  - (b) a lower guiding seat having an upper fixing surface and a lower fixing surface, said lower guiding seat being movable along said lower guiding seat; and
  - (c) a wire electrode fixed between said upper and lower guiding seats.

DETAILED DESCRIPTION OF THE PREFERRED EMBODIMENT

Figure 1:
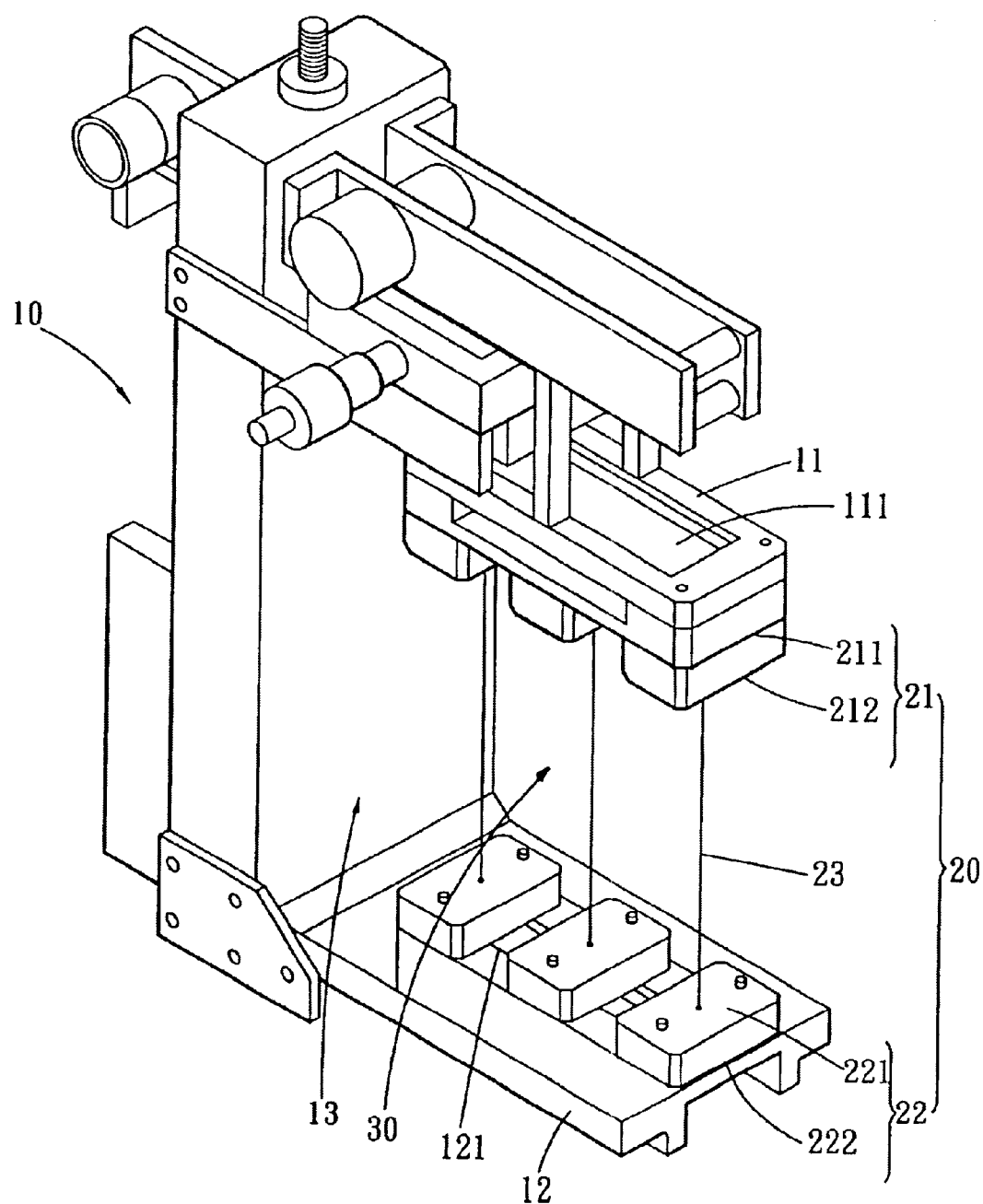
FIG. 1 is a perspective view of the present invention.
Figure 2:
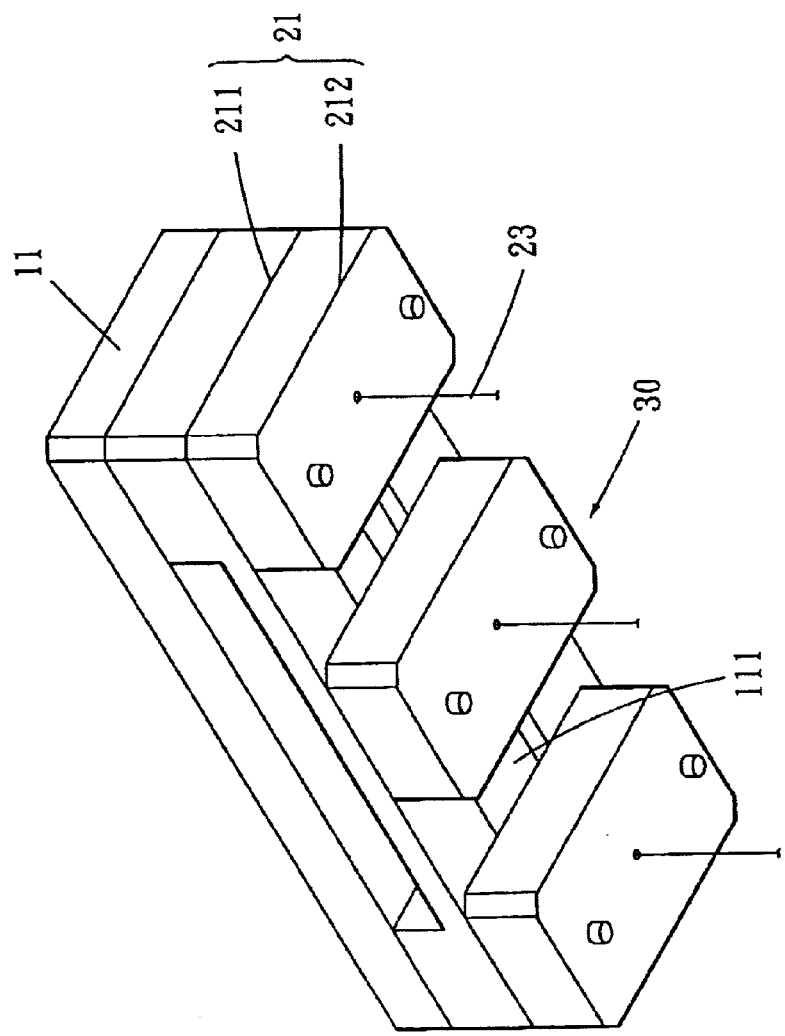
FIG. 2 is an enlarged perspective view of a selected portion of the present invention.

Referring to FIGS. 1 and 2, the present invention is a wire cut electric discharge machine. It comprises a cutting machine 10, a plurality of wire electrode sets 20, and an adjustable unit 40.

The cutting machine 10 has an upper fixing portion 11 and a lower fixing portion 12. A working space 13 is formed between the upper fixing portion 11 and the lower fixing portion 12. An upper surface is disposed on the upper fixing portion 11 and a lower surface is disposed on the lower fixing portion 12. An upper sliding slot 111 is disposed on the upper fixing portion 11. A lower sliding slot 121 is disposed on the lower fixing portion 12 corresponding to the upper sliding slot 111.

With regard to the wire electrode sets 20, they are aligned and disposed in the working space 13. Each electrode set 20 includes:
- (a) an upper guiding seat 21 that has an upper fixing end 211 and a lower fixing end 212 and the upper guiding seat 21 is movable along the upper sliding slot 111;
- (b) a lower guiding seat 22 that has an upper fixing surface 221 and a lower fixing surface 222 and the lower guiding seat 22 is movable along the lower guiding seat 22; and
- (c) a wire electrode 23 that is fixed between the corresponding upper and lower guiding seats 21, 22.

A separated space 30 is formed between every two adjacent wire electrodes 23. The wire electrode 23 having two ends that can be adjusted respectively along one direction. Therefore, the shape of the separated space 30 can be changed. By adjusting the tilted angles of these wire electrodes 23, the cutting angles and types for a workpiece is easily adjustable.

Figure 3:
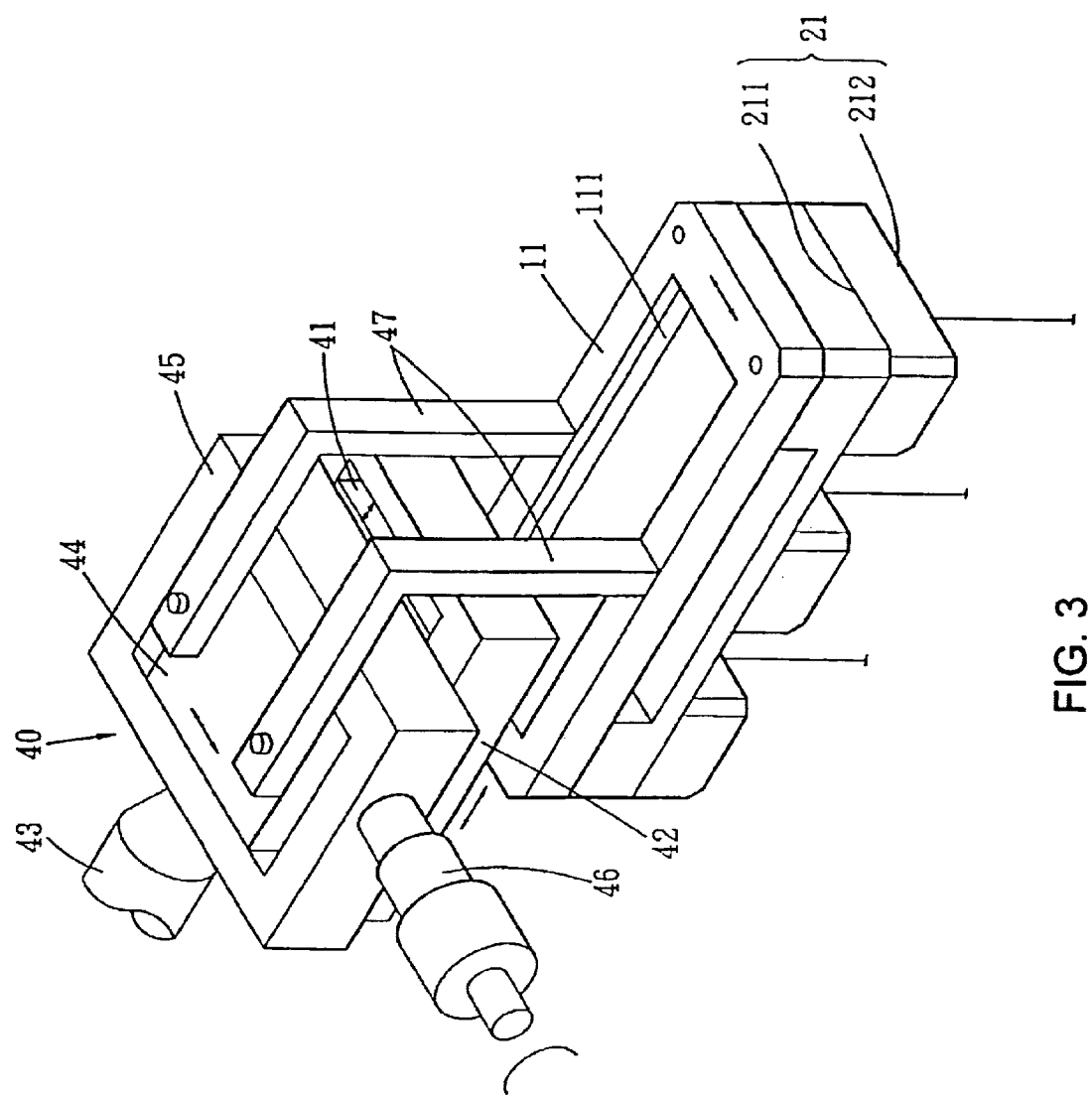
FIG. 3 is another enlarged perspective view of a selected portion of the present invention.

As shown in FIG. 3, the wire electrodes 23 can be separately adjusted along the upper sliding slot 11 by the upper guiding seat 21. In addition, the upper fixing portion 11 is disposed with an adjusting unit 40 for moving the wire electrodes 23 having a wider range of displacement.

Concerning the adjusting unit 40, it has an u-axis movable block 41 that is movably fixed in an u-axis sliding frame 42 and driven by an u-axis driving device 43, and a V-axis movable block 44 that is movably fixed in a V-axis sliding frame 45 and driven by a V-axis driving device 46. The U-axis movable block 41 is connected with the V-axis movable block 44. The V-axis movable block 44 extends a L-shaped arm 47 for connecting and moving the upper fixing portion 11.

Figure 4:
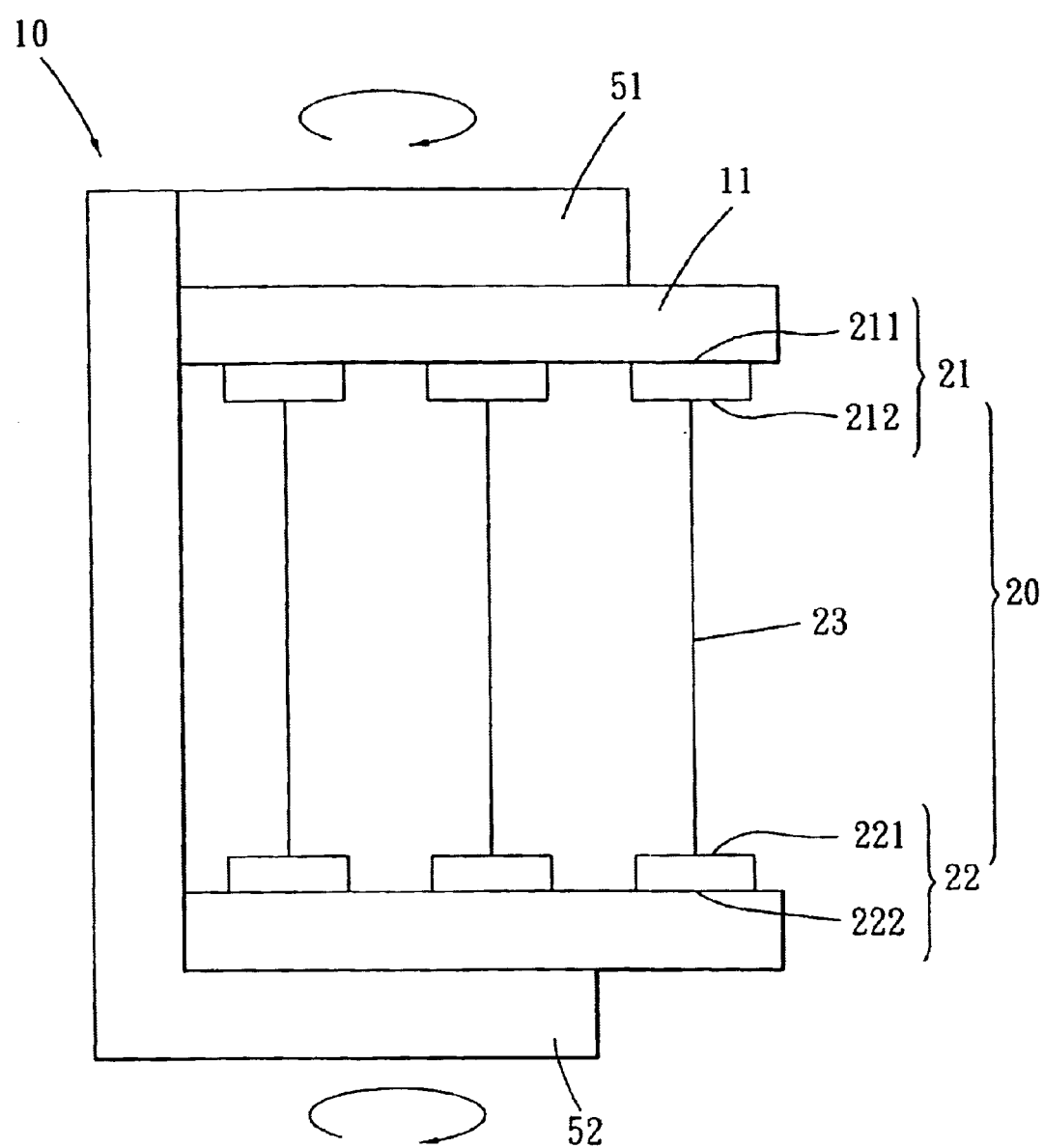
FIG. 4 is a front view of a portion of the present invention in FIG. 1.

By changing the adjusting unit 40, the separated spaces 30 can be adjusted. Besides, the upper fixing portion 11 and the lower fixing portion 12 can be connected with an upper rotating device 51 and a lower rotating device 52 respectively (referring to FIG. 4) so that both the upper and lower fixing portions 11, 12 can rotate certain angles horizontally on the cutting machine 10. Therefore, the separated spaces 30 can be adjusted or changed with more varieties.

Figure 5:
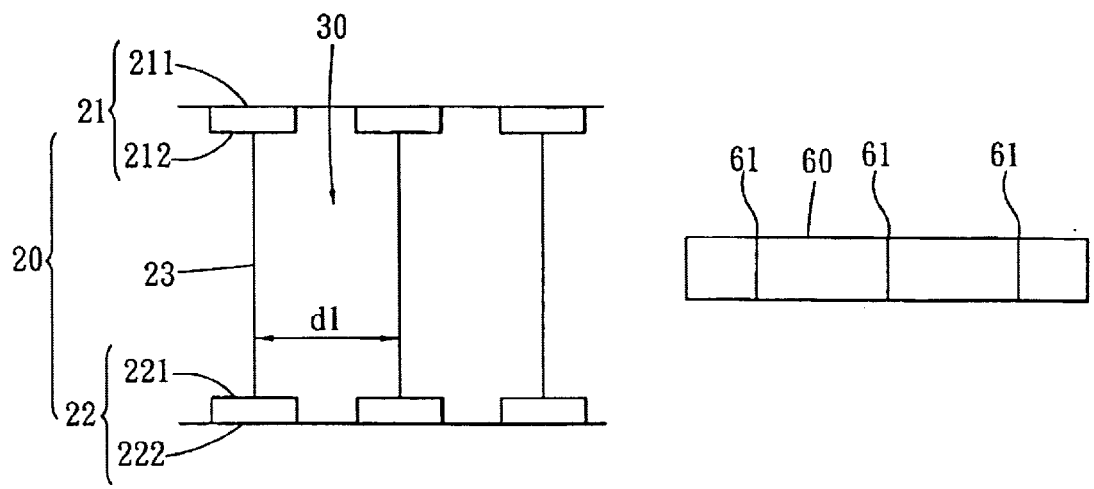
FIG. 5 is a front view showing the straight wire electrodes of this invention.

More specifically, as shown in FIG. 5, when these wire electrodes 23 are parallel, the separated spaces 30 are equally distributed (for example, the distance between two adjacent wire electrodes is defined as d1). The cutting portion 61 on the workpiece 60 should be equally distributed.

Figure 6:
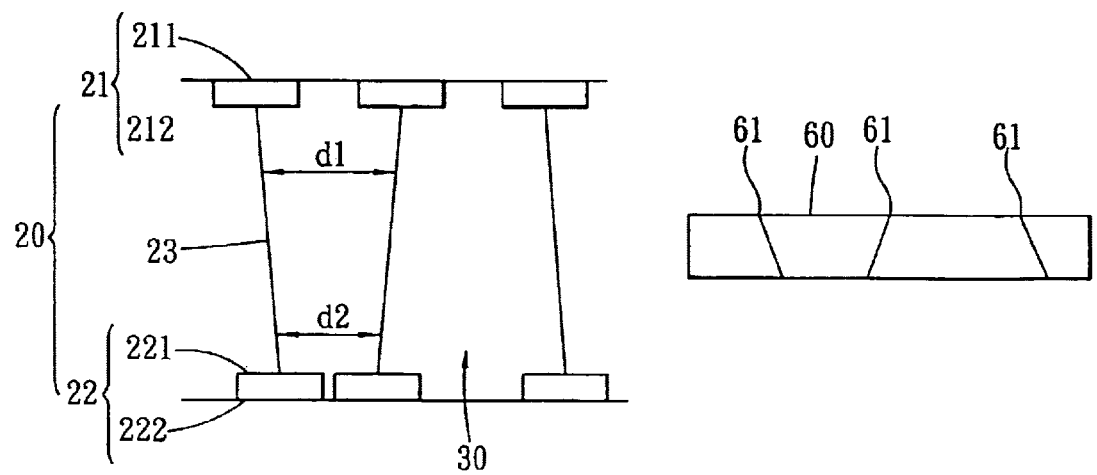
FIG. 6 is a front view showing the tilted wire electrodes of this invention.
Figure 7:
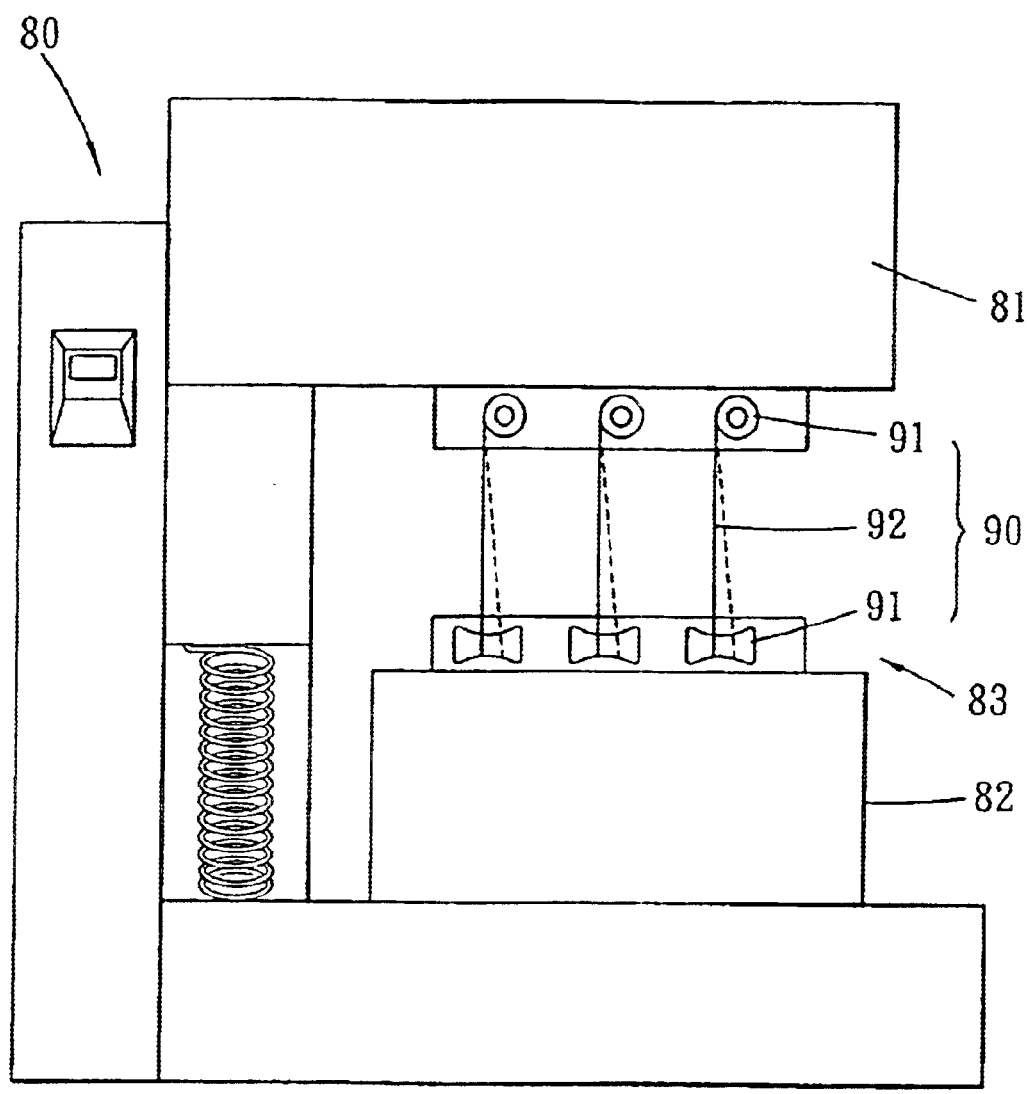
FIG. 7 illustrates a conventional wire cut electric discharge machine.

Under some special condition, the workpiece 60 needs to be cut as the one (having tilted cutting lines) shown in FIG. 6. The user only needs to adjust the position on the lower sliding slot 121 of the lower guiding seat 22 so that the original equal distributed distance d will be changed into the distance d1 at the upper portion and into another distance d2 at the lower portion. Thus, the cutting portions 61 with different tilting angles are possible and can be easily adjusted. Similarly, adjusting the position on the upper sliding slot 121 of the upper guiding seat 21 is an equivalent operation.

The advantages and functions of this invention can be summarized as follows:

[1] The cutting angles can be adjusted independently. The separated spaces are located between every two adjacent wire electrodes. By adjusting one of or both of the upper and lower guiding elements, a desired special tilting cutting angles on the workpiece can be obtained. It makes a significant break through in this field.

[2] The cutting precision is higher than before. Each wire electrode is movably fixed by the upper and lower guiding seats. Also, each the guiding seat can be adjusted independently. So, the cutting angle can be precisely controlled. Thus, the cutting precision is higher than before.

The above embodiments are only used to illustrate the present invention, not intended to limit the scope thereof. Many modifications of the above embodiments can be made without departing from the spirit of the present invention.

Whats is claimed is:

1. A wire cut electric discharge machine comprising:
    a cutting machine having an upper fixing portion and a lower fixing portion, a working space being formed between said upper fixing portion and said lower fixing portions, an upper surface being disposed on said upper fixing portion and a lower surface being disposed on said lower fixing portion, an upper sliding slot being disposed on said upper fixing portion, a lower sliding slot being disposed on said lower fixing portion corresponding to said upper sliding slot;
    a plurality of wire electrode sets aligned and disposed in said working space and aligned; each electrode set including:
        (a) an upper guiding seat having an upper fixing end and a lower fixing end, said upper guiding seat being movable along said upper sliding slot;
        (b) a lower guiding seat having an upper fixing surface and a lower fixing surface, said lower guiding seat being movable along said lower guiding seat; and
        (c) a wire electrode fixed between said upper and lower guiding seats.

2. The wire cut electric discharge machine according to claim 1, wherein said upper fixing portion is disposed with an adjusting unit for moving said wire electrodes, and said adjusting unit having an u-axis movable block that is movably fixed in an u-axis sliding frame and driven by an u-axis driving device, and a V-axis movable block that is movably fixed in a V-axis sliding frame and driven by a V-axis driving device, said U-axis movable block is connected with said V-axis movable block, said V-axis movable block extends a L-shaped arm for connecting and moving said upper fixing portion.

3. The wire cut electric discharge machine according to claim 1, said upper fixing portion is mounted on an upper rotating device, and said lower fixing portion is mounted on a lower rotating device so as to allow said upper and lower fixing portions to be horizontally rotated respectively.

* * * * *